(12) United States Patent
Walker et al.

(10) Patent No.: US 12,187,909 B2
(45) Date of Patent: Jan. 7, 2025

(54) COPPER BASED CONDUCTIVE INK COMPOSITION AND METHOD OF MAKING THE SAME

(71) Applicant: ELECTRONINKS INCORPORATED, Austin, TX (US)

(72) Inventors: Steven Brett Walker, Austin, TX (US); Leonardo Zornberg, Austin, TX (US)

(73) Assignee: Electroninks Incorporated, Austin, TX (US)

( * ) Notice: Subject to any disclaimer, the term of this patent is extended or adjusted under 35 U.S.C. 154(b) by 0 days.

(21) Appl. No.: 17/822,873

(22) Filed: Aug. 29, 2022

(65) Prior Publication Data
US 2023/0242783 A1     Aug. 3, 2023

Related U.S. Application Data

(63) Continuation of application No. 16/473,230, filed as application No. PCT/US2017/065283 on Dec. 8, 2017, now Pat. No. 11,427,727.

(60) Provisional application No. 62/439,033, filed on Dec. 24, 2016.

(51) Int. Cl.

| | |
|---|---|
| *C09D 11/00* | (2014.01) |
| *B41M 5/00* | (2006.01) |
| *C09D 11/033* | (2014.01) |
| *C09D 11/037* | (2014.01) |
| *C09D 11/322* | (2014.01) |
| *C09D 11/36* | (2014.01) |
| *C09D 11/38* | (2014.01) |
| *C09D 11/52* | (2014.01) |

(52) U.S. Cl.
CPC .......... *C09D 11/52* (2013.01); *B41M 5/0023* (2013.01); *C09D 11/033* (2013.01); *C09D 11/037* (2013.01); *C09D 11/322* (2013.01); *C09D 11/36* (2013.01); *C09D 11/38* (2013.01); *C09D 11/00* (2013.01)

(58) Field of Classification Search
CPC ..... C09D 11/52; C09D 11/033; C09D 11/037; C09D 11/322; C09D 11/36; C09D 11/38; C09D 11/00
USPC ............................ 106/31.01, 31.13; 427/240
See application file for complete search history.

(56) References Cited

U.S. PATENT DOCUMENTS

| | | | |
|---|---|---|---|
| 3,907,699 A | 9/1975 | Blair | |
| 6,887,958 B1 | 5/2005 | Mihan et al. | |
| 8,066,805 B2 * | 11/2011 | Zurcher ................. | C23C 18/44 427/343 |
| 9,469,773 B2 | 10/2016 | Walker et al. | |
| 10,301,497 B2 | 5/2019 | Walker | |

(Continued)

FOREIGN PATENT DOCUMENTS

| | | |
|---|---|---|
| CN | 101880493 B | 3/2013 |
| WO | 2013096664 A1 | 6/2013 |
| WO | 2015160938 A1 | 10/2015 |

*Primary Examiner* — James E McDonough
(74) *Attorney, Agent, or Firm* — David A. Roise; VLP Law Group LLP

(57) ABSTRACT

Disclosed herein are ink compositions for making a conductive copper structure. The ink composition comprise a copper metal precursor compound, a chelating agent, and a reducing agent. In some embodiments, the redox potential of the reducing agent is adjusted for controlled reduction of copper ion in the copper metal precursor to metal copper metal. Also disclosed herein are methods for making the ink compositions and methods for using the same.

18 Claims, 2 Drawing Sheets

(56) References Cited

U.S. PATENT DOCUMENTS

| | | |
|---|---|---|
| 2005/0006339 A1 | 1/2005 | Mardilovich et al. |
| 2005/0113476 A1 | 5/2005 | Akiyama et al. |
| 2008/0134936 A1 | 6/2008 | Kamikoriyama et al. |
| 2013/0236637 A1* | 9/2013 | Kashiwabara ............ C01B 6/02 423/645 |
| 2014/0312284 A1 | 10/2014 | Liu et al. |
| 2015/0004325 A1 | 1/2015 | Walker et al. |
| 2015/0217374 A1 | 8/2015 | Kim et al. |
| 2016/0167130 A1 | 6/2016 | Ida et al. |
| 2016/0293288 A1 | 10/2016 | Hu et al. |
| 2017/0210930 A1 | 7/2017 | Walker |
| 2017/0342279 A1 | 11/2017 | Kawamura et al. |
| 2018/0134909 A1 | 5/2018 | Paquet et al. |
| 2019/0315989 A1 | 10/2019 | Walker |

* cited by examiner

COPPER BASED CONDUCTIVE INK COMPOSITION AND METHOD OF MAKING THE SAME

CROSS-REFERENCE TO RELATED APPLICATIONS

This application is a continuation of U.S. application Ser. No. 16/473,230, filed on Jun. 24, 2019, which is a national stage application of PCT International Application No. PCT/US2017/065283, filed Dec. 8, 2017, which claims the benefit of U.S. Provisional Application No. 62/439,033, filed Dec. 24, 2016, entitled "Copper Based Conductive Ink Composition and Method of Making the Same," the content each of which is incorporated herein by reference in its entirety.

FIELD OF THE INVENTION

The present disclosure is related generally to conductive ink compositions and more particularly to copper-based inks that may be deposited to form highly conductive coatings or patterns.

BACKGROUND

The vast majority of commercially produced conductive inks are specifically designed for inkjet, screen-printing, or roll-to-roll processing methods in order to process large areas with fine-scale features in short time periods. These inks have disparate viscosities and synthesis parameters. Particle-based inks are based on conductive metal particles, which are typically synthesized separately and then incorporated into an ink formulation. The resulting ink is then tuned for the specific particle process. Precursor-based inks are based on thermally unstable precursor complexes that reduce to a conductive metal upon heating. Prior particle- and precursor-based methods generally rely on high temperatures to form conductive coatings and thus may not be compatible with substrates that require low processing temperatures to maintain integrity. For example, silver compounds with carbamate or other relatively low molecular weight ligands (compared to polymer stabilizers) have been synthesized that decompose at temperatures near 150° C., yielding electrical conductivities approaching that of bulk silver. Unfortunately, even these temperatures render the ink incompatible with many plastic and paper substrates used in flexible electronic and biomedical devices.

Precursor-based silver inks have been obtained at a lower temperature that is more compatible with existing printing media. For example, U.S. Pat. No. 9,469,773 discloses using complexing agent and a short chain carboxylic acid to reduce silver salt to metal form at a temperature of about 120° C. or less.

Silver is an expensive metal. A cheaper alternative such as copper would be more desirable. However, it is even more difficult to reduce ionic copper to metallic form: it often requires very strong reducing agent or even higher reaction temperature than a silver compound does, making it very difficult to control the speed of reduction and the resulting metal copper is often unusable for its intended purposes.

What is needed in the art are better compositions and methods for creating high quality conductive copper ink.

SUMMARY OF THE INVENTION

In one aspect, disclosed herein is an ink composition for making a conductive copper structure. The ink composition comprise a copper metal precursor compound: $Cu_mX_n$, where m and n are integers equal or greater than 1, and where X comprises one substituent selected from the group consisting of hydrogen, ammonium, acetate, oxygen, sulfur, halogen, cyano, cyanate, carbonate, formate, nitrate, nitrite, sulfate, phosphate, thiocyanate, chlorate, perchlorate, tetrafluoroborate, acetylacetonate, mercapto, amide, alkoxide, carboxylate and derivatives thereof; a chelating agent; and a reducing agent. In some embodiments, the redox potential of the reducing agent is adjusted for controlled reduction of copper ion in the copper metal precursor to metal copper metal.

In some embodiments, the redox potential of the reducing agent is adjusted by a) the use of a blocking agent or b) modification of the reducing agent itself.

In some embodiments, the copper metal precursor compound comprises a copper (II) compound, a copper (I) compound or a combination thereof.

In some embodiments, the chelating agent comprises one selected from the group consisting of a pyridine, a pyrazine, methyl pyrazine, an alkyl amine, an alcohol amine, ammonia, carboxylatopyrazine, methoxypropylamine, a fluoroacetaldehyde, an amine aldehyde oligomer prepared via condensation, and combinations thereof.

In some embodiments, the alkyl amine comprises one selected from the group consisting of methylamine, ethylamine, triethanolamine, methylenediamine, ethylenediamine, penicillamine, propylamine, butylamine, and amylamine.

In some embodiments, the reducing agent comprises one selected from the group consisting of an ester, an ether, an amide, an imine such as a primary aldimine or secondary aldimine, an oxime, an aldoxime, trioxane, paraldehyde, metaldehyde, a formaldehyde trimer, a hydrazine, a hypophosphite, 2-Dimethylamino-2-methylpropanol (DMAMP), 4-Dimethylaminopyridine (DMAP), hexamethylenetetramine, ammonia acetaldehyde trimer, and combinations thereof.

In some embodiments, the blocking agent is selected from the group consisting of an acid, an alcohol, an amine, and combinations thereof.

In some embodiments, the blocking agent is selected from the group consisting of formic acid, acetic acid (ethanoic acid), propionic acid (propanoic acid), butyric acid (butanoic acid), valeric acid (pentanoic acid), caproic acid (hexanoic acid), oxalic acid (ethanedioic acid), lactic acid (2-hydroxypropanoic acid), malic acid (2-hydroxybutanedioic acid), vitric acid (2-hydroxypropane-1,2,3-tricarboxylic acid), benzoic acid (benzenecarboxylic acid or phenylmethanoic acid), carbonic acid (hydroxymethanoic acid), uric acid (7,9-dihydro-1H-purine-2,6,8(3H)-trione), taurine (2-aminoethanesulfonic acid), p-toluenesulfonic acid (4-methylbenzenesulfonic acid), trifluoromethanesulfonic acid (aka triflic acid), phosphonic acid, aminomethylphosphonic acid, methanol, ethanol, propan-2-ol, butan-1-ol, pentan-1-ol, hexadecan-1-ol, ethane-1,2-diol, propane-1,2-diol, propane-1,2,3-triol, butane-1,2,3,4-tetraol, pentane-1,2,3,4,5-pentol, hexane-1,2,3,4,5,6-hexol, heptane-1,2,3,4,5,6,7-heptol, prop-2-ene-1-ol, 3,7-dimethylocta-2,6-dien-1-ol, prop-2-yn-1-ol, cyclohexane-1,2,3,4,5,6-hexol, 2-(2-propyl)-5-methylcyclohexane-1-ol, a primary amine, a secondary amine, a tertiary amine, a cyclic amine, ammonia, ethanolamine (2-aminoethanol), propylamine, isopropylamine, methylamine, dimethylamine, methylethanolamine, diphenylamine, trimethylamine, triphenylamine, aziridine, piperidine, and combinations thereof.

In some embodiments, the modification of the reducing agent itself comprises dimerization or oligomerization of the reducing agent.

In some embodiments, the ink composition further comprises a solvent selected from the group consisting of ethanol, butanol, propylene glycol, water, diethyleneglycol diethoxyether, an alcohols, an ether, and combinations thereof.

In some embodiments, the ink composition further comprises a catalyst selected from the group consisting of hydride, pyrene, pyridine, pyrazine, formic acid, and combinations thereof.

In some embodiments, an ink composition further comprises elemental copper, where the elemental copper is formed by reduction of a portion of the copper metal precursor compound.

In some embodiments, the ink composition has a viscosity of between about 1 mPas and about $10^6$ mPas under low shear conditions.

In some embodiments, the copper metal precursor compound is a copper (II) salt, wherein the chelating agent is methyl pyrazine, and wherein the reducing agent is a custom synthesized trimer precursor for formaldehyde having the following structure:

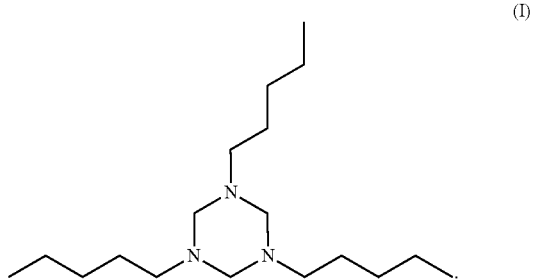 [SMILES: CCCCCN1CN(CCCCC)CN(CCCCC)C1]

(I)

In some embodiments, the ink composition further comprises ethylenediamine.

In some embodiments, the ink composition further comprises a solvent selected from the group consisting of ethanol, butanol, propylene glycol, water, and combinations thereof.

In some embodiments, copper metal precursor compound is a copper (I) salt, wherein the chelating agent is methyl pyrazine, and wherein the reducing agent is paraldehyde:

In one aspect, also disclosed herein is a method of making a conductive copper structure. The method comprises the steps of combining a copper salt and a chelating agent with a reducing agent, wherein the redox potential of the reducing agent is adjusted for reduction of copper ion in the copper metal precursor through a) the use of a blocking agent or b) modification of the reducing agent itself, and reducing the copper salt to form a conductive copper structure, wherein the conductive copper structure are formed at a temperature of about 140° C. or lower, wherein full reduction of the conductive salt is achieved via catalytic unblocking of the reducing agent.

In some embodiments, the method further comprises forming one or more organic compounds, wherein the full reduction of the copper salt is accompanied by volatilization of the one or more organic compounds.

In some embodiments, the conductive copper structure comprises a resistivity of about $2\times10^{-5}$ Ω-cm or less.

In some embodiments, the temperature is about 120° C. or lower.

In some embodiments, the method further comprises depositing the ink composition onto a substrate.

In some embodiments, the ink composition is deposited onto the substrate by a method selected from the group consisting of spray processing, dip coating, spin coating, inkjet printing and e-jet printing.

In one aspect, disclose herein is a method of applying a conductive ink composition. The method comprises depositing, onto a substrate, the ink composition of any embodiments disclosed herein.

One of skill in the art would understand that, when applicable, any embodiments disclosed herein can be applied in any aspect.

BRIEF DESCRIPTION OF THE DRAWINGS

Those of skill in the art will understand that the drawings, described below, are for illustrative purposes only. The drawings are not intended to limit the scope of the present teachings in any way.

DETAILED DESCRIPTION OF THE INVENTION

Definitions

Figure 1:
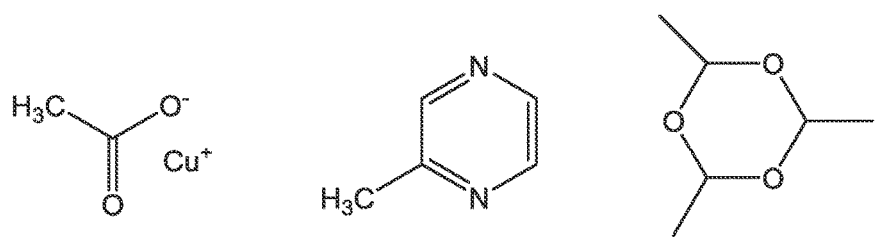
FIG. 1 illustrates a sample embodiment.

A desirable ink design may have one or more of the following characteristics. First, the ink synthesis procedure may be both simple and high-yield. Second, the ink may possess low viscosity so that it is compatible with a broad range of patterning techniques, including direct ink writing, inkjet printing, and airbrush spraying. Third, the patterned features may be highly conductive at room temperature and achieve bulk conductivity upon annealing at mild temperatures (e.g., <100° C.). Finally, the ink may remain stable at room temperature for months without particle precipitation.

Accordingly, a conductive ink composition (also referred to as a "conductive ink" or an "ink") has been created for printing highly conductive features (>104 S/cm) at room temperature. Such inks may be stable, particle-free, and suitable for a wide range of patterning techniques. The conductive ink composition may be highly transparent and can be printed through highly flexible, ultrafine nozzles (e.g., 100 nm diameter) via direct ink writing. Upon annealing at 90° C., printed electrodes prepared from such inks may exhibit an electrical conductivity equivalent to bulk copper.

As disclosed herein, the terms "conductive ink composition," "ink composition" and "ink" are used interchangeably.

As disclosed herein, copper is considered conductive if a copper metal has a resistivity of around $1\times10^{-4}$ Ω-centimeter or less, preferably $1\times10^{-5}$ Ω-centimeter or less. Pure copper has a resistivity of $1.7\times10^{-6}$ Ω-centimeter. In some embodiments, a conductive copper as disclosed herein has a resistivity of $9\times10^{-5}$ Ω-centimeter or less, $8\times10^{-5}$ Ω-centimeter or less, $7\times10^{-5}$ Ω-centimeter or less, $6\times10^{-5}$ Ω-centimeter or less, $5\times10^{-5}$ Ω-centimeter or less, $4\times10^{-5}$ Ω-centimeter or less, $3\times10^{-5}$ Ω-centimeter or less, $2\times10^{-5}$ Ω-centimeter or less, $1\times10^{-5}$ Ω-centimeter or less, $9\times10^{-6}$ Ω-centimeter or less, $8\times10^{-6}$ Ω-centimeter or less, $7\times10^{-6}$ Ω-centimeter or less, $6\times10^{-6}$ Ω-centimeter or less, $5\times10^{-6}$ Ω-centimeter or less, $4\times10^{-6}$ Ω-centimeter or less, $3\times10^{-6}$ Ω-centimeter or less, or $2\times10^{-6}$ Ω-centimeter or less.

In one aspect, disclosed herein is an ink composition for forming conductive copper ink. The copper ink composition serves as a precursor for the fabrication of highly conductive copper coatings, lines and patterns. Due to the low boiling points of the non-copper components (e.g., 140° C. or below), the conductive ink may be processed at low temperatures and can be engineered for compatibility with multiple processing techniques (e.g., ink jet printing, aerosol jet printing, screen-printing, roll-to-roll printing, direct ink writing, electrohydrodynamic jet (e-jet) printing, dip-coating, spin-coating, and spray processing such as airbrush).

In some embodiments, an ink composition comprises a copper metal compound, a chelating agent and a reducing agent. The copper metal compound can be a copper (I) compound, a copper (II) compound, or a combination thereof. Any suitable copper salt in the form of CumXn can be used, where m and n are integers equal or greater than 1. X is a substituent that includes but is not limited to hydrogen, ammonium, acetate, oxygen, sulfur, halogen, cyano, cyanate, carbonate, formate, nitrate, nitrite, sulfate, phosphate, thiocyanate, chlorate, perchlorate, tetrafluoroborate, acetylacetonate, mercapto, amide, alkoxide, carboxylate, or any derivative thereof. Additional examples of copper salts include but are not limited to copper acetate, copper formate, copper carbonate, copper fluoride, copper nitrate, copper nitrite, copper chloride, copper bromide, copper iodide, copper phosphate, copper trifluoroacetate, copper acetylacetonate, copper sulfate, or copper oxide. Preferably the copper salt is copper acetate or copper formate. In some embodiments, the preparation of the ink takes advantage of an acid-base complex formed between the complexing agent and the short chain carboxylic acid and the fact that each of the complexing agent, the short chain carboxylic acid, and the optional solvent has a boiling point of at most 140° C.

Numerous chelating agents that can form a complex with copper (I) or copper (II) may be included in the ink composition. Upon heating, catalysis, or both, the chelator-copper complex can decompose to form metallic copper and one or more byproducts that each have a boiling point of 140° C. or lower. The byproducts would evaporate and leave behind only the metallic copper, which functions as the conductive ink. For the metallic copper to be conductive, the resulting metallic copper should be substantially free of gas bubbles. For example, the metallic copper cannot be too spongy. The resulting metallic copper should largely remain in non-oxidized state. Copper oxidizes relatively easily and oxidized copper leads to reduced conductivity.

In some embodiments, chelator-copper complex decomposes at a temperature of 150° C. or lower, 140° C. or lower, 130° C. or lower, 120° C. or lower, 110° C. or lower, 100° C. or lower, 90° C. or lower, or 80° C. or lower.

As noted above, a chelator-copper complex decomposes at a relatively low temperature (e.g., 140° C. or lower), which means the chelated copper complex cannot be too stable. In other words, the interactions between the chelating agent and copper ions cannot be too strong. For example, copper chelated with ethylenediaminetetraacetic acid (EDTA) would require a lot of energies to break down which can correspond to a very high reaction temperature that does not work with most available printing materials.

Exemplary chelating agents include but are not limited to a pyridine, a pyrazine such as methyl pyrazine, an alkyl amine, an alcohol amine, ammonia, carboxylatopyrazine, methoxypropylamine, a fluoroacetaldehyde, and an amine aldehyde oligomer prepared via condensation. In some embodiments, the alkyl amine includes but is not methylamine, ethylamine, triethanolamine, methylenediamine, ethylenediamine, penicillamine, propylamine, butylamine, amylamine, or combinations thereof.

In one embodiment, the chelating agent is an alkyl amine. To form the conductive ink, the silver salt is dissolved in the alkyl amine. An alkyl amine is an amino group substituted by at least one C1-8 alkyl group, where an alkyl group refers to a hydrocarbon group which may be linear, cyclic, or branched or a combination thereof having the number of carbon atoms designated (i.e., C1-8 means one to eight carbon atoms). Examples of alkyl groups include methyl, ethyl, n-propyl, isopropyl, n-butyl, t-butyl, isobutyl, sec-butyl, pentyl, isopentyl, cyclohexyl, cyclopentyl, and the like. An alkyl amine may be a primary, secondary or tertiary amine, preferably a primary amine.

In some embodiments, an ink composition includes a reducing agent. In some embodiments, the reducing agent is a proton donating agent such as an aldehyde or hydrazine. Exemplary aldehydes include but are not limited to formaldehyde (methanal), acetaldehyde (ethanal), propionaldehyde (propanal), butyraldehyde (butanal), benzaldehyde (phenylmethanal), cinnamaldehyde, vanillin, tolualdehyde, furfural, retinaldehyde. In some embodiments, dialdehydes can be used, including but not limited to glyoxal, malondialdehyde, succindialdehyde, glutaraldehyde, phthalaldehyde, and etc.

In comparison to more noble metals such as silver, copper is more stable in ionic state and it requires a relatively strong reducing agent to convert ionic copper, copper (I) or copper (II), into metallic form. A redox potential is a measure of the tendency of a chemical species to acquire electrons and thereby be reduced. Reduction potential is measured in volts (V), as shown in the following table.

TABLE 1

Standard Redox Potentials of Selected Reduction Half-Reactions at 25° C.

| Half-Reaction | E° (V) |
|---|---|
| $F_2(g) + 2e^- \rightarrow 2F^-(aq)$ | 2.87 |
| $H_2O_2(aq) + 2H^+(aq) + 2e^- \rightarrow 2H_2O(l)$ | 1.78 |
| $Ce^{4+}(aq) + e^- \rightarrow Ce^{3+}(aq)$ | 1.72 |
| $PbO_2(s) + HSO_4^-(aq) + 3H^+(aq) + 2e^- \rightarrow PbSO_4(s) + 2H_2O(l)$ | 1.69 |
| $Cl_2(g) + 2e^- \rightarrow 2Cl^-(aq)$ | 1.36 |
| $Cr_2O_7^{2-}(aq) + 14H^+(aq) + 6e^- \rightarrow 2Cr^{3+}(aq) + 7H_2O(l)$ | 1.23 |
| $O_2(g) + 4H^+(aq) + 4e^- \rightarrow 2H_2O(l)$ | 1.23 |
| $MnO_2(s) + 4H^+(aq) + 2e^- \rightarrow Mn^{2+}(aq) + 2H_2O(l)$ | 1.22 |
| $Br_2(l) + 2e^- \rightarrow 2Br^-(aq)$ | 1.09 |
| $NO_3^-(aq) + 3H^+(aq) + 2e^- \rightarrow HNO_2(aq) + H_2O(l)$ | 0.93 |
| $Ag^+(aq) + e^- \rightarrow Ag(s)$ | 0.80 |
| $Fe^{3+}(aq) + e^- \rightarrow Fe^{2+}(aq)$ | 0.77 |
| $H_2SeO_3(aq) + 4H^+ + 4e^- \rightarrow Se(s) + 3H_2O(l)$ | 0.74 |
| $O_2(g) + 2H^+(aq) + 2e^- \rightarrow H_2O_2(aq)$ | 0.70 |
| $MnO_4^-(aq) + 2H_2O(l) + 3e^- \rightarrow MnO_2(s) + 4OH^-(aq)$ | 0.60 |
| $MnO_4^{2-}(aq) + 2H_2O(l) + 2e^- \rightarrow MnO_2(s) + 4OH^-(aq)$ | 0.60 |
| $I_2(s) + 2e^- \rightarrow 2I^-(aq)$ | 0.54 |
| $H_2SO_3(aq) + 4H^+(aq) + 4e^- \rightarrow S(s) + 3H_2O(l)$ | 0.45 |
| $O_2(g) + 2H_2O(l) + 4e^- \rightarrow 4OH^-(aq)$ | 0.40 |
| $Cu^{2+}(aq) + 2e^- \rightarrow Cu(s)$ | 0.34 |
| $AgCl(s) + e^- \rightarrow Ag(s) + Cl^-(aq)$ | 0.22 |
| $Cu^{2+}(aq) + e^- \rightarrow Cu^+(aq)$ | 0.15 |
| $Sn^{4+}(aq) + 2e^- \rightarrow Sn^{2+}(aq)$ | 0.15 |
| $2H^+(aq) + 2e^- \rightarrow H_2(g)$ | 0.00 |
| $Sn^{2+}(aq) + 2e^- \rightarrow Sn(s)$ | -0.14 |
| $2SO_4^{2-}(aq) + 4H^+(aq) + 2e^- \rightarrow S_2O_6^{2-}(aq) + 2H_2O(l)$ | -0.22 |
| $Ni^{2+}(aq) + 2e^- \rightarrow Ni(s)$ | -0.26 |
| $PbSO_4(s) + 2e^- \rightarrow Pb(s) + SO_4^{2-}(aq)$ | -0.36 |
| $Cd^{2+}(aq) + 2e^- \rightarrow Cd(s)$ | -0.40 |
| $Cr^{3+}(aq) + e^- \rightarrow Cr^{2+}(aq)$ | -0.41 |

TABLE 1-continued

Standard Redox Potentials of Selected Reduction Half-Reactions at 25° C.

| Half-Reaction | E° (V) |
|---|---|
| $Fe^{2+}(aq) + 2e^- \rightarrow Fe(s)$ | −0.45 |
| $Ag_2S(s) + 2e^- \rightarrow 2Ag(s) + S^{2-}(aq)$ | −0.69 |
| $Zn^{2+}(aq) + 2e^- \rightarrow Zn(s)$ | −0.76 |
| $Al^{3+}(aq) + 3e^- \rightarrow Al(s)$ | −1.662 |
| $Be^{2+}(aq) + 2e^- \rightarrow Be(s)$ | −1.85 |
| $Li^+(aq) + e^- \rightarrow Li(s)$ | −3.04 |

As shown above, redox potentials are associated with the state of a particular reagent. For example, the redox potential of copper (In) ion in aqueous solution to copper meta is +0.337 E° V. The redox potential of copper (1) ion in aqueous solution to copper metal is +0.520 E° V. The redox potential of silver (1) ion in aqueous solution is +0.7996 E° V, but it is +0.22 E° V as solid AgCl. It is much easier for $Ag^+$ (aq) to acquire an electron than $Cu^{2+}$ (aq). Reduction of $Cu^{2+}$ (aq) or $Cu^+$ (aq) would require more energy input; for example, at a much higher reaction temperature. By supplying electrons, a reducing agent makes it easier for a copper ion to acquiring electrons and be reduced to metallic form.

Table 1 can be used to quickly predict the relative strengths of various oxidants and reductants. As a general rule of thumb, any species on the left side of a half-reaction will spontaneously oxidize any species on the right side of another half-reaction that lies below it in the table. Conversely, any species on the right side of a half-reaction will spontaneously reduce any species on the left side of another half-reaction that lies above it in the table.

A strong reducing agent, however, can lead to reaction conditions that are hard-to-control. For example, when mixture with a copper salt, formaldehyde would reduce copper ion to copper metal at room temperature. Such a composition is very unstable and cannot be used as an ink composition. An ink composition must be stable enough during transportation and storage. Additionally, un-controlled gas release can lead to metallic copper that is spongy with compromised conductivity. The compositions and methods disclosed herein adjust the reductive strength of a reducing agent such that the reaction conditions are more conducive for forming conductive copper metal. For example, the combination of a complexing agent and a short chain carboxylic acid disclosed in U.S. Pat. No. 9,469,773, which was effective in reducing silver salt to metal form at a temperature of about 120° C. or less, cannot be applied to produce conductive copper. A similar combination would cause the metal copper to immediately oxidize in ambient atmospheres, rendering the composition unusable for its intended purpose.

In some embodiments, the reducing agent is modified such that the effective redox potential of the reducing agent is more suitable for reducing copper ions to conductive metallic copper. In some embodiments, the reducing agent reacts with a blocking agent to form an intermediate compound with decreased reducing power. Exemplary intermediate compounds include but are not limited to an ester, an ether, an amide, an imine such as a primary aldimine or secondary aldimine, or an oxime such as an aldoxime. A blocking agent can be an acid, an alcohol, an amine (including ammonia) and etc. In some embodiments, the blocking agent reacts with the reducing agent before the resulting compound is mixed with other components in ink composition. For example, an ester, an ether, an amide, an imine such as a primary aldimine or secondary aldimine, or an oxime such as an aldoxime is included in the ink composition instead of an aldehydate. In some embodiments, the blocking agent and the reducing agent are mixed as separate ingredients with other components in ink composition.

Exemplary acids that can be used as a blocking agent include but are not limited to formic acid, acetic acid (ethanoic acid), propionic acid (propanoic acid), butyric acid (butanoic acid), valeric acid (pentanoic acid), caproic acid (hexanoic acid), oxalic acid (ethanedioic acid), lactic acid (2-hydroxypropanoic acid), malic acid (2-hydroxybutanedioic acid), vitric acid (2-hydroxypropane-1,2,3-tricarboxylic acid), benzoic acid (benzenecarboxylic acid or phenylmethanoic acid), carbonic acid (hydroxymethanoic acid), uric acid (7,9-dihydro-1H-purine-2,6,8(3H)-trione), taurine (2-aminoethanesulfonic acid), p-toluenesulfonic acid (4-methylbenzenesulfonic acid), trifluoromethanesulfonic acid (aka triflic acid), phosphonic acid, aminomethylphosphonic acid, and derivatives thereof.

Exemplary alcohols that can be used as a blocking agent include but are not limited to methanol, ethanol, propan-2-ol, butan-1-ol, pentan-1-ol, hexadecan-1ol, ethane-1,2-diol, propane-1,2-diol, propane-1,2,3-triol, butane-1,2,3,4-tetraol, pentane-1,2,3,4,5-pentol, hexane-1,2,3,4,5,6-hexol, heptane-1,2,3,4,5,6,7-heptol, prop-2-ene-1-ol, 3,7-dimethyl-octa-2,6-dien-1-ol, prop-2-yn-1-ol, cyclohexane-1,2,3,4,5,6-hexol, 2-(2-propyl)-5-methyl-cyclohexane-1-ol, and etc.

Amines that can be used as a blocking agent can be a primary amine, a secondary amine, a tertiary amine, or a cyclic amine, including but not limited to ammonia, ethanolamine (2-aminoethanol), propylamine, isopropylamine, methylamine, dimethylamine, methylethanolamine, diphenylamine, trimethylamine, triphenylamine, aziridine, piperidine.

In some embodiments, a powerful reducing agent such as a hydrazine is used in combination with a blocking agent. Hydrazine by itself reduces copper too rapidly and cannot be stabilized. The result copper metal does not have desirable conductivity. In some embodiments, one or more hydrogens in hydrazine $N_2H_4$ are replaced by a functional group that is more sterically stringent, which leads to decreased reductive efficiency of the modified hydrazine molecule.

In some embodiments, the reducing agent is modified through dimerization or oligomerization of the reducing agent itself. In some embodiments, a trimer of formaldehyde such as trioxane can be used as the reducing agent. Additionally, paraldehyde or custom synthesized formaldehyde trimer (see FIG. 2) can also be used as the reducing agent.

In the example illustrated in FIG. 1, an exemplary ink composition comprises copper (I) acetate as the copper salt and methyl pyrazine as the chelating agent. Here, instead of acetaldehyde, a trimer of acetaldehyde (paraldehyde) is used as the reducing agent. Paraldehyde is a less reactive derivative of 1,3,5-trioxane. Use of paraldehyde leads to formation of a continuous and dense copper form having the suitable conductivity. In some embodiments, formic acid is used as a catalyst. In such embodiments, the ink composition should be anhydrous.

In another example (FIG. 2), an exemplary ink composition comprises a copper (II) salt such as copper (II) formate, a chelating agent methyl pyrazine. A custom synthesized formaldehyde trimer as shown below can be used as the reducing agent.

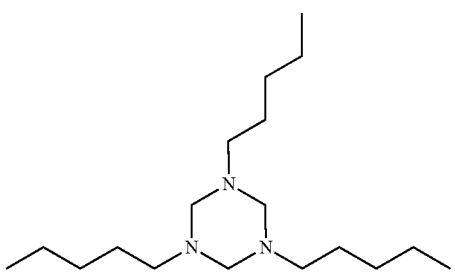 [SMILES: CCCCCN1CN(CCCCC)CN(CCCCC)C1]

Here the cyclic trimer is formed by mixing equimolar amylamine and formaldehyde. In some embodiments, the ink composition further comprises ethylenediamine.

In some embodiments, a solvent may be added the ink composition to further adjust the redox potential of the reducing agent. In some embodiments, the solvent has a boiling point of around 140° C. Examples of suitable solvents include water, alcohols (including for example, methanol, ethanol, 1-propanol and 2-propanol), esters, ketones, and ethers. In some embodiments, the solvent can be water or ethanol.

In some embodiments, the ink composition further comprises a catalyst such as copper hydride, pyridine, pyrazine, pyrene, formic acid, or deriviates thereof. In some embodiments, the catalyst can be a more reactive metal such as nickel and cobalt. In some embodiments, the chelating agent itself is also a hydrogen transfer agent and can also function as a catalyst. For example, pyridine, pyrizine, ammonium formate, and other derivatives act as a chelator as well as a hydrogen transfer agent to catalyze the decomposition of the aldehyde precursor.

In some embodiments, one or more approaches are taken to prevent oxidation of the metallic copper that is reduced from copper ion. In some embodiments, the reducing agent is added in excess stoichiometric amount in comparison to the copper compound to ensure that any oxidized copper will be reduced again by extra reducing agent. In some embodiments, the stoichiometric amount of the reducing agent is 1 to 10% more than the stoichiometric amount of the copper salt. In some embodiments, the stoichiometric amount of the reducing agent is 10% or more than the stoichiometric amount of the copper salt. In some embodiments, the stoichiometric amount of the reducing agent is 20% or more than the stoichiometric amount of the copper salt. In some embodiments, the stoichiometric amount of the reducing agent is 30% or more than the stoichiometric amount of the copper salt. In some embodiments, the stoichiometric amount of the reducing agent is 40% or more than the stoichiometric amount of the copper salt. In some embodiments, the stoichiometric amount of the reducing agent is 50% or more than the stoichiometric amount of the copper salt. In some embodiments, the stoichiometric amount of the reducing agent is 60% or more than the stoichiometric amount of the copper salt. In some embodiments, the stoichiometric amount of the reducing agent is 70% or more than the stoichiometric amount of the copper salt. In some embodiments, the stoichiometric amount of the reducing agent is 80% or more than the stoichiometric amount of the copper salt. In some embodiments, the stoichiometric amount of the reducing agent is 90% or more than the stoichiometric amount of the copper salt. In some embodiments, the stoichiometric amount of the reducing agent is 100% or more than the stoichiometric amount of the copper salt. In some embodiments, the stoichiometric amount of the reducing agent is 120% or more than the stoichiometric amount of the copper salt. In some embodiments, the stoichiometric amount of the reducing agent is 140% or more than the stoichiometric amount of the copper salt. In some embodiments, the stoichiometric amount of the reducing agent is 160% or more than the stoichiometric amount of the copper salt. In some embodiments, the stoichiometric amount of the reducing agent is 180% or more than the stoichiometric amount of the copper salt. In some embodiments, the stoichiometric amount of the reducing agent is 200% or more than the stoichiometric amount of the copper salt. In some embodiments, the stoichiometric amount of the reducing agent is 250% or more than the stoichiometric amount of the copper salt. In some embodiments, the stoichiometric amount of the reducing agent is 300% or more than the stoichiometric amount of the copper salt. In some embodiments, the stoichiometric amount of the reducing agent is 400% or more than the stoichiometric amount of the copper salt. In some embodiments, the stoichiometric amount of the reducing agent is 500% or more than the stoichiometric amount of the copper salt. In some embodiments, the stoichiometric amount of the reducing agent is 1000% or more than the stoichiometric amount of the copper salt.

In some embodiments, a protective solvent with a high boiling point is included. In such embodiments, reactions of the ink composition occur under at least two different temperatures. Copper ion is then reduced at a first temperature that is lower than the boiling point of the protective solvent. The metallic copper is shielded from oxygen under a film of protective solvent until the copper fuses in a conductive form. Then, the reaction mix is raised to a second and higher temperature that would evaporate the protective solvent and leave behind only the conductive copper metal.

In some embodiments, a protective solvent has a boiling point higher than 140° C., including but not limited to dimethylformamide (DMF), dimethyl sulfoxide (DMSO), propylene carbonate, o-xyleneand and etc. In some embodiments, the protective solvent does not reactive with the other components in the ink composition. In some embodiments, one of the reactive components can also function as the protective solvent. It will be understood that the choice of a protective solvent is relative to the reactive temperature. In some embodiments, when metallic copper is formed at a temperature that is lower than 140° C., for example, 130° C., 120° C. or lower, the protective solvent can have a boiling point lower than 140° C.

In some embodiments, the viscosity of the ink composition is adjusted to a pre-determined range for a specific purpose. The SI derived unit for dynamic viscosity is the pascal second. 1 pascal second (pas-s) is equal to 1000 mPa-s, or 1000 centipoise (cP). In some embodiments, the viscosity of the ink composition is between 1 mPa-s and about $10^6$ mPa-s. In some embodiments, the viscosity of the ink composition is between 0.2 and 200,000 mPa-s.

In one aspect, disclosed herein is a method for making the conductive ink composition. In some embodiments, a copper compound is combined with a chelating agent first before a reducing agent is added to the mixture. In some embodiments, the reducing agent is modified first before being included in the ink composition. In some embodiments, the modification includes reacting the reducing agent with a blocking agent. In some embodiments, the reducing agent is modified through dimerization or oligomerization. In some embodiments, the reducing agent is modified by increasing steric hindrance of one or more of the substituents of the reducing agent.

An ink composition as disclosed herein can be deposited onto any suitable substrate, including but not limited to silicon (including a textured silicon), glass, ethylene vinyl acetate, polyethylene terephthalate (PET), foam, cellulose acetate, cellophane, and polyimide.

Having described the invention in detail, it will be apparent that modifications, variations, and equivalent embodiments are possible without departing the scope of the invention defined in the appended claims. Furthermore, it should be appreciated that all examples in the present disclosure are provided as non-limiting examples.

EXAMPLES

The following non-limiting examples are provided to further illustrate embodiments of the invention disclosed herein. It should be appreciated by those of skill in the art that the techniques disclosed in the examples that follow represent approaches that have been found to function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example 1

Proton Catalyzed Aldehyde Decomposition 1

In this example, copper (1) hydride in fluoroacetaldehyde and 1,3,5-trioxane formed fully metallized copper at 120° C. Although fully metallized, the resulting copper was too spongy and resulted in limited conductivity. One of the products, trifluoroacetic acid is toxic and may not suitable for most coating lines. In addition, copper (1) hydride is difficult to synthesize, unstable and relatively insoluble.

As an alternative, copper (I) acetate is fully dissolved in pyridine and 1,3,5-trioxane. Upon heating, fully metallized of copper was obtained accompanied by the release of formic acid.

Example 2

Proton Catalyzed Aldehyde Decomposition 2

Copper (I) acetate was combined with methyl pyrazine in the presence of paraldehyde and acetic acid (FIG. 1). Upon heating, paraldehyde functioned as the reducing agent: itself oxidized in air and produced acetic acid while copper (I) was reduced to metallic form. Methyl pyrazine functioned as a chelating agent.

As an alternative, formic acid was used as a catalyst, which led to the formation of byproducts including acetic acid, carbon dioxide, methyl pyrazine, and copper metal.

The boiling point for methyl pyrazine is 135° C. and the boiling temperature of acetic acid is about 118° C. At a reaction temperature around 140° C., all other chemical reagents in either reaction formulation were evaporated, leaving only metallic copper. It was noted that byproducts with higher boiling points allowed formation of a continuous dense film of copper.

It is imperative that the formulations are anhydrous.

Example 3

Proton Catalyzed Aldehyde Decomposition 3

Figure 2:
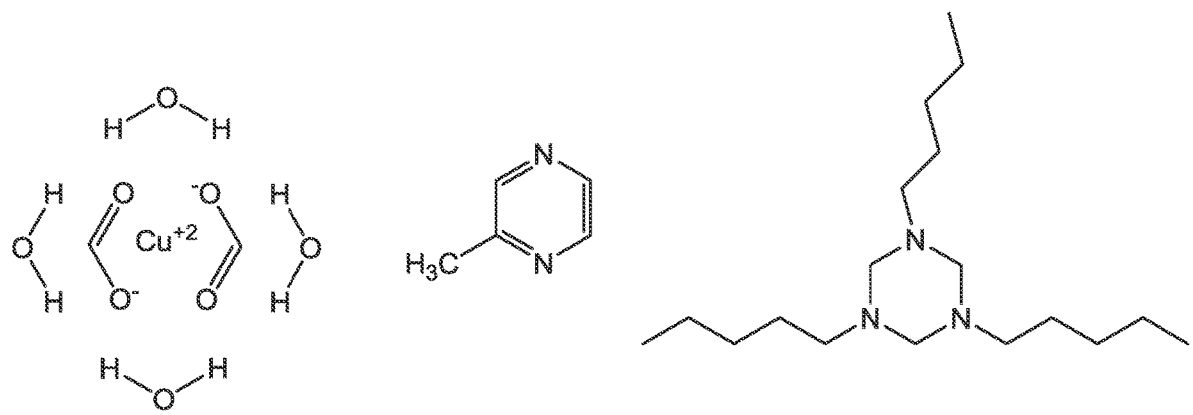
FIG. 2 illustrates a sample embodiment.

In this example, a copper (II) salt (e.g., copper formate) was mixed with methyl pyrazine and a custom synthesized formaldehyde trimer (FIG. 2). Upon heating to about 120° C. to 140° C., carbon dioxide, methyl pyrazine, amylamine and copper metal were formed. At this temperature range, all other chemical reagents were evaporated, leaving only metallic copper.

The reaction here was insensitive to water.

Here, equimolar amylamine with formalin were mixed to form:

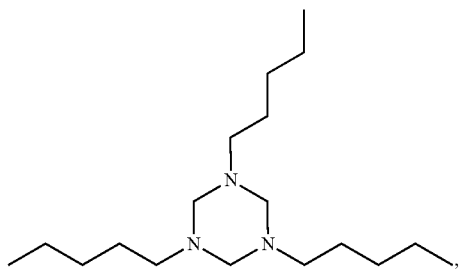 [SMILES: CCCCCN1CN(CCCCC)CN(CCCCC)C1]

which is a precursor of formaldehyde trimer or 1,3,5-trioxane. This additional step led to more controlled reduction and yielded metallic copper with more desirable conductive properties.

Example 4

Copper (II) Formate 0.5 grams of copper (I) formate was dissolved in 1 ml of 2-Dimethylamino-2-methylpropanol (DMAMP). The resulting copper-DMAMP complex decomposed 120-140° C. to form copper metal.

Figure 3:
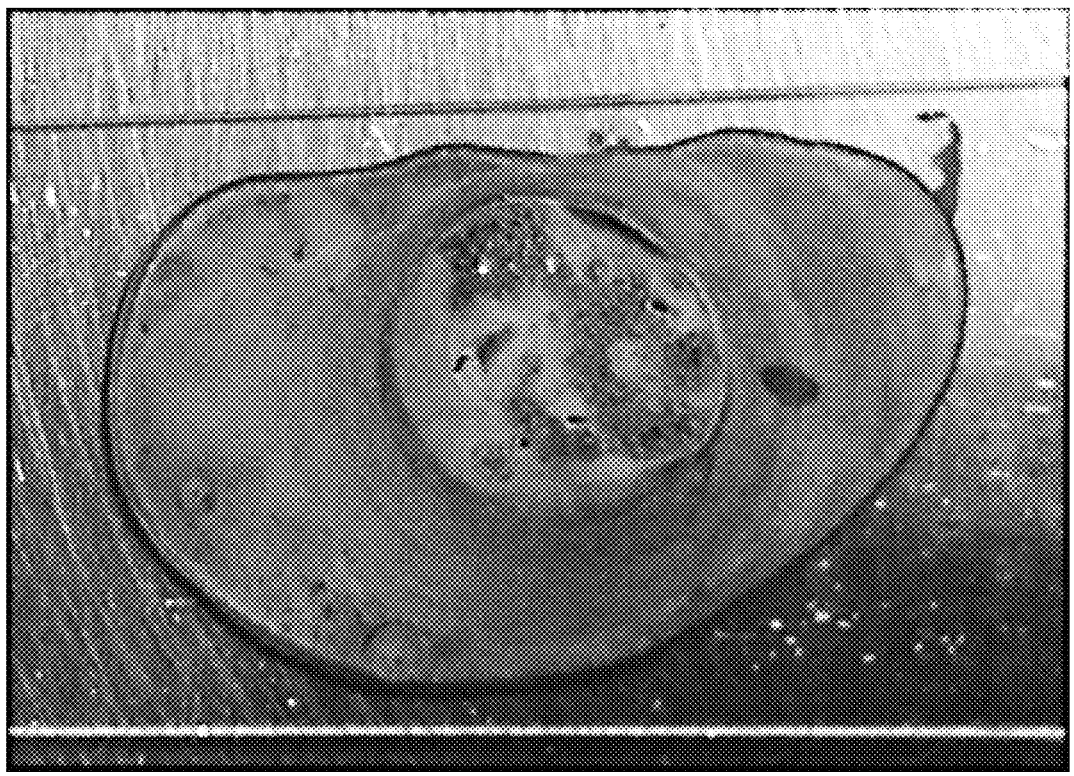
FIG. 3 illustrates a sample embodiment.

As depicted in FIG. 3, the surface of the copper film formed was only slightly oxidized. Photonic annealing could be used to improve the quality of the resulting metallic copper.

Example 5

Hydrazine and Hydrazones

This example showed that, without modification or adjustment, hydrazine and hydrazones were far too aggressive and immediately precipitated out copper when being added to copper salt, regardless of other chelating agents. Hydrazine and hydrazones would slowly decompose and build pressure of $N_2$ and $H_2$, making any ink composition comprising these ingredients unstable and potentially dangerous in storage. Functional groups that add steric hindrance can be added to provide stability and modulate reactivity.

The various methods and techniques described above provide a number of ways to carry out the invention. Of course, it is to be understood that not necessarily all objectives or advantages described may be achieved in accordance with any particular embodiment described herein.

Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art.

In some embodiments, the numbers expressing quantities of ingredients, properties such as molecular weight, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

In some embodiments, the terms "a" and "an" and "the" and similar references used in the context of describing a particular embodiment of the invention (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein. Variations on those preferred embodiments will become apparent to those of ordinary skill in the art upon reading the foregoing description. It is contemplated that skilled artisans can employ such variations as appropriate, and the invention can be practiced otherwise than specifically described herein. Accordingly, many embodiments of this invention include all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above cited references and printed publications are herein individually incorporated by reference in their entirety.

In closing, it is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

We claim:

1. An ink composition for making a conductive copper structure, the ink composition comprising:
    a copper metal precursor compound: $Cu_mX_n$, wherein m and n are integers equal or greater than 1, and wherein X comprises one substituent selected from the group consisting of hydrogen, ammonium, acetate, oxygen, sulfur, halogen, cyano, cyanate, carbonate, formate, nitrate, nitrite, sulfate, phosphate, thiocyanate, chlorate, perchlorate, tetrafluoroborate, acetylacetonate, mercapto, amide, alkoxide, carboxylate and derivatives thereof;
    a chelating agent; and
    a reducing agent selected from the group consisting of an ester, an amide, an imine, an oxime, an aldoxime, trioxane, paraldehyde, metaldehyde, a formaldehyde trimer, a hydrazine, a hypophosphite, 2-Dimethylamino-2-methylpropanol (DMAMP), 4-Dimethylaminopyridine (DMAP), hexamethylenetetramine, ammonia acetaldehyde trimer, and combinations thereof;
    wherein a redox potential of the reducing agent is adjusted for controlled reduction of a copper ion in the copper metal precursor compound to copper metal;

wherein the redox potential of the reducing agent is adjusted by a) the use of a blocking agent or b) modification of the reducing agent itself; and wherein the modification of the reducing agent itself comprises dimerization or oligomerization of the reducing agent.

2. The ink composition of claim 1, wherein the copper metal precursor compound comprises a copper (II) compound, a copper (I) compound or a combination thereof.

3. The ink composition of claim 1, wherein the chelating agent comprises one selected from the group consisting of a pyridine, a pyrazine, methyl pyrazine, an alkyl amine, an alcohol amine, ammonia, carboxylatopyrazine, methoxypropylamine, a fluoroacetaldehyde, an amine aldehyde oligomer prepared via condensation, and combinations thereof.

4. The ink composition of claim 3, wherein the alkyl amine comprises one selected from the group consisting of methylamine, ethylamine, triethanolamine, methylenediamine, ethylenediamine, penicillamine, propylamine, butylamine, and amylamine.

5. The ink composition of claim 1, wherein the imine is selected from the group consisting of a primary aldimine, a secondary aldimine, and combinations thereof.

6. The ink composition of claim 1, wherein the blocking agent is selected from the group consisting of an acid, an alcohol, an amine, and combinations thereof.

7. The ink composition of claim 6, wherein the blocking agent is selected from the group consisting of formic acid, acetic acid (ethanoic acid), propionic acid (propanoic acid), butyric acid (butanoic acid), valeric acid (pentanoic acid), caproic acid (hexanoic acid), oxalic acid (ethanedioic acid), lactic acid (2-hydroxypropanoic acid), malic acid (2-hydroxybutanedioic acid), vitric acid (2-hydroxypropane-1,2,3-tricarboxylic acid), benzoic acid (benzenecarboxylic acid or phenylmethanoic acid), carbonic acid (hydroxymethanoic acid), uric acid (7,9-dihydro-1H-purine-2,6,8 (3H)-trione), taurine (2-aminoethanesulfonic acid), p-toluenesulfonic acid (4-methylbenzenesulfonic acid), trifluoromethanesulfonic acid (triflic acid), phosphonic acid, aminomethylphosphonic acid, methanol, ethanol, propan-2-ol, butan-1-ol, pentan-1-ol, hexadecan-1-ol, ethane-1,2-diol, propane-1,2-diol, propane-1,2,3-triol, butane-1,2,3,4-tetraol, pentane-1,2,3,4,5-pentol, hexane-1,2,3,4,5,6-hexol, heptane-1,2,3,4,5,6,7-heptol, prop-2-ene-1-ol, 3,7-dimethylocta-2,6-dien-1-ol, prop-2-yn-1-ol, cyclohexane-1,2,3,4,5,6-hexol, 2-(2-propyl)-5-methyl-cyclohexane-1-ol, a primary amine, a secondary amine, a tertiary amine, a cyclic amine, ammonia, ethanolamine (2-aminoethanol), propylamine, isopropylamine, methylamine, dimethylamine, methylethanolamine, diphenylamine, trimethylamine, triphenylamine, aziridine, piperidine, and combinations thereof.

8. The ink composition of claim 1, further comprising:
a solvent selected from the group consisting of ethanol, butanol, propylene glycol, water, diethyleneglycol, diethoxyether, an alcohol, an ether, and combinations thereof.

9. The ink composition of claim 1, further comprising:
a catalyst selected from the group consisting of hydride, pyrene, pyridine, pyrazine, formic acid, and combinations thereof.

10. The ink composition of claim 1, further comprising:
elemental copper, wherein the elemental copper is formed by reduction of a portion of the copper metal precursor compound.

11. The ink composition of claim 10, wherein the ink composition has a viscosity of between about 1 mPa-s and about $10^6$ mPa-s at room temperature under low shear conditions.

12. A method of making a conductive copper structure, the method comprising:
combining a copper salt and a chelating agent with a reducing agent selected from the group consisting of an ester, an amide, an imine, an oxime, an aldoxime, trioxane, paraldehyde, metaldehyde, a formaldehyde trimer, a hydrazine, a hypophosphite, 2-Dimethylamino-2-methylpropanol (DMAMP), 4-Dimethylaminopyridine (DMAP), hexamethylenetetramine, ammonia acetaldehyde trimer, and combinations thereof, to form an ink composition, wherein a redox potential of the reducing agent is adjusted for reduction of a copper ion in the copper salt through a) the use of a blocking agent or b) modification of the reducing agent itself, wherein the modification of the reducing agent itself comprises dimerization or oligomerization of the reducing agent; and
reducing the copper salt to form a conductive copper structure, wherein the conductive copper structure is formed at a temperature of about 140° C. or lower, wherein full reduction of the copper salt is achieved via catalytic unblocking of the reducing agent.

13. The method of claim 12, further comprising:
forming one or more organic compounds, wherein the full reduction of the copper salt is accompanied by volatilization of the one or more organic compounds.

14. The method of claim 12, wherein the conductive copper structure comprises a resistivity of about $2 \times 10^{-5}$ Ω-cm or less.

15. The method of claim 12, wherein the temperature is about 120° C. or lower.

16. The method of claim 12, further comprising:
depositing the ink composition onto a substrate.

17. The method of claim 16, wherein the ink composition is deposited onto the substrate by a method selected from the group consisting of spray processing, dip coating, spin coating, inkjet printing and e-jet printing.

18. A method of applying a conductive ink composition, comprising:
depositing, onto a substrate, the ink composition of claim 1.

* * * * *